W. S. BLAISDELL.
Coffee-Pots.

No. 147,361. Patented Feb. 10, 1874.

WITNESSES:
P. C. Dieterich.
C. L. Everitt.

INVENTOR
Wm S Blaisdell
per J. H. Alexander
ATTORNEYS.

UNITED STATES PATENT OFFICE.

WILLIAM S. BLAISDELL, OF FACTORY POINT, VERMONT.

IMPROVEMENT IN COFFEE-POTS.

Specification forming part of Letters Patent No. 147,361, dated February 10, 1874; application filed December 13, 1873.

*To all whom it may concern:*

Be it known that I, WILLIAM S. BLAISDELL, of Factory Point, in the county of Bennington and State of Vermont, have invented certain new and useful Improvements in Coffee-Pot; and I do hereby declare that the following is a full, clear, and exact description thereof, reference being had to the accompanying drawings and to the letters of reference marked thereon, which form a part of this specification.

The nature of my invention consists in the construction and arrangement of a removable apparatus for drenching coffee by continuous circulation of water through the same, as will be hereinafter more fully set forth.

In order to enable others skilled in the art to which my invention appertains to make and use the same, I will now proceed to describe its construction and operation, referring to the annexed drawing, in which—

Figure 1:
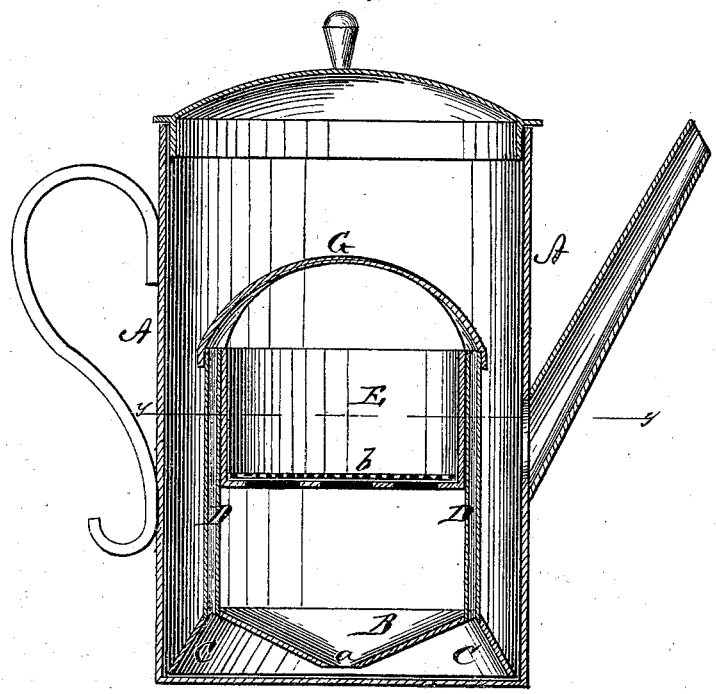
Figure 2:
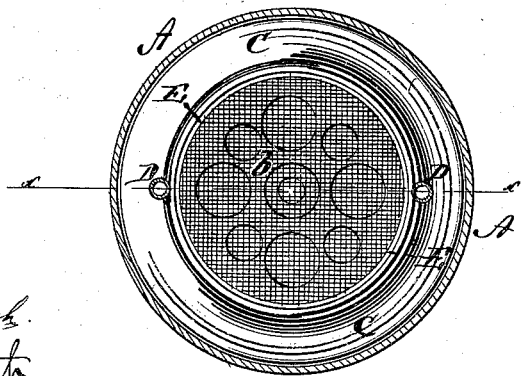

Figure 1 is a longitudinal vertical section of a coffee-pot with my apparatus in the same; and Fig. 2 is a horizontal section of the same through the line $y\ y$, Fig. 1.

A represents an ordinary coffee-pot, on the bottom of which my drenching apparatus is placed. The apparatus is constructed as follows: B represents a funnel-shaped cup, with central orifice $a$, and to the upper edge of this funnel is attached a flaring circumferential rim, C, which extends downward below the point or end of the funnel, and forms the foot of the drenching apparatus. From the angle at the joint between the funnel B and rim C extend two or more vertical tubes, D D, upward to a suitable height, and between their upper portions is secured a cup, E. The upper ends of the tubes D D extend exactly to the upper edge of the cup E, and terminate under the ends or lips of the handle G, which is formed concave, so as to act as a dispenser of the water forced up through the tubes D D. The bottom of the cup E is perforated, as shown, and inside of the cup is a false bottom, $b$, of perforated sheet metal, to cover the flannel.

This drenching apparatus being placed on the bottom of the pot A, the outer vessel A is filled with water to such a depth that it will touch, or nearly touch, the perforated bottom of the coffee-cup E. When the steam generates under the cup B C, it rises to the tubes D D, which are partially full of water, and thus forces the water upward. The water, striking against the handle, is dispensed over the coffee, drenching it. This action is continuous as long as the pot remains over the fire.

It is well known that drenching is the only perfect method for extracting the strength of coffee without loss of the aroma. The passage of water once through the mass is not sufficient, but a continuous circuit for a certain length of time is needed. This is effectually accomplished by my device, which, furthermore, is removable, and can be easily taken out for cleaning.

Having thus fully described my invention, what I claim as new, and desire to secure by Letters Patent, is—

1. The tubes D D, in combination with handle G, the latter being formed concave on its under surface, substantially for the purpose set forth.

2. In a removable steeping and drenching apparatus for coffee, the cup B with flaring rim C, tubes D D, cup E, and handle G, all combined in the manner and for the purpose described.

In testimony that I claim the foregoing as my own, I affix my signature in presence of two witnesses.

WILLIAM S. BLAISDELL.

Witnesses:
RICHARD W. DEAN,
F. D. DEAN.